United States Patent [19]

Takada, deceased

[11] 3,915,400

[45] Oct. 28, 1975

[54] INERTIAL LOCKING SAFETY BELT DEVICE

[75] Inventor: Takezo Takada, deceased, late of Tokyo, Japan, by Juichiro Takada, legal representative

[73] Assignee: Takata Kojyo Co., Ltd., Tokyo, Japan

[22] Filed: Dec. 11, 1973

[21] Appl. No.: 423,872

[30] Foreign Application Priority Data
Dec. 11, 1972  Japan.............................. 47-123414

[52] U.S. Cl............................. 242/107.4; 242/107.4
[51] Int. Cl.²......................................... B65H 75/48
[58] Field of Search ....... 242/105 R, 107.4, 107 SB; 297/388; 280/150 SB

[56] References Cited
UNITED STATES PATENTS

| | | | |
|---|---|---|---|
| 2,845,233 | 7/1958 | Pfankuch......................... | 242/107.4 |
| 3,074,761 | 1/1963 | Ryan.............................. | 242/107.4 X |
| 3,180,456 | 4/1965 | Whittingham ............... | 242/107.4 X |
| 3,632,056 | 6/1972 | Hibbard.......................... | 242/107.4 |
| 3,695,545 | 10/1972 | Peters ............................. | 242/107.4 |

*Primary Examiner*—Edward J. McCarthy
*Attorney, Agent, or Firm*—Wolder & Gross

[57] ABSTRACT

An improved inertia safety belt locking device having a biased ratchet wheel and a pivotal engagement pawl. The inertia device includes a portion pawl member having an inverted U-shaped upper portion containing pivotally mounted first and second pinions. The pawl lever is rotatably mounted on the ratchet wheel shaft and also contains a regularly mounted spur gear and a rotatably mounted second gear, both respectively engageable with the first and second pinions. The load biased clutched plate abuts the rotatably mounted gear so that no acceleration above the predetermined level will result in a delayed movement of the fly wheel, the rotatable mounted gear and hence the pinion gears. This will cause the pull operating lever to pivot and accordingly pivot the pull into engagement with the ratchet.

5 Claims, 4 Drawing Figures

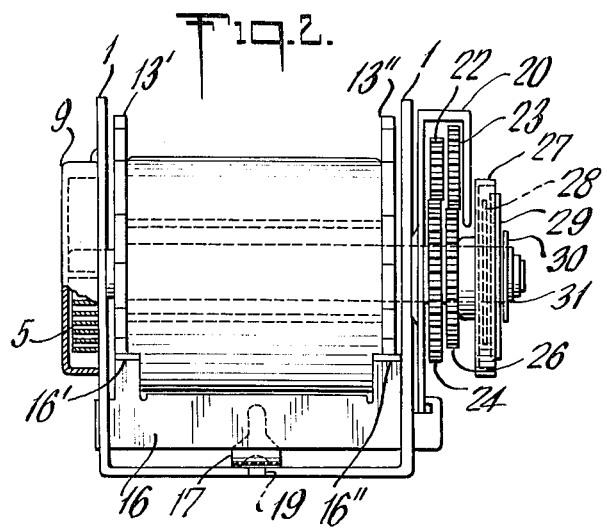
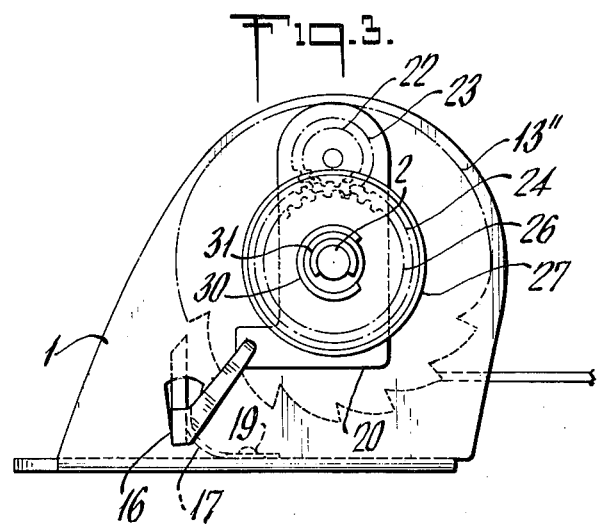
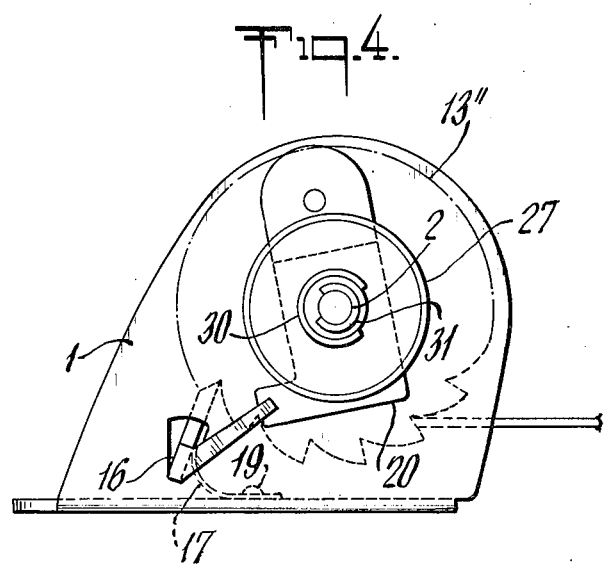

INERTIAL LOCKING SAFETY BELT DEVICE

BACKGROUND OF THE INVENTION

This invention relates to a winding device for safety belts installed in motor vehicles and the like, and more particularly it relates to such safety belt winding device which locks automatically in an emergency, whereby when the vehicle or such equipped with the present device is in normal running, the belt can be freely extended out or wound back under a constant tension without restricting movements of the belt wearer, but when a sharp and heavy load is exerted to the vehicle, such as in the event of collision, sudden stop or abnormal inclination of the vehicle, the device locks automatically to inhibit draw-out of the belt so as to restrict any rush movement of the belt wearer to thereby ensure his safety.

In the conventional emergency-locked type safety belt winding devices, elaborate works and adjustment have been required for the correct setting of the responding speed and hence such setting was extremely difficult. In order to eliminate such defect, the present invention is designed to allow easy and correct setting of the responding speed by controlling the gear speed ratio and to also keep the gears free of any excess load by providing a clutch mechanism to thereby enhance safety of the device.

OBJECT OF THE PRESENT INVENTION

Accordingly, it is among the principal objects of the present invention to provide an improved inertia locking safety belt device which carries an improved, simpler inertia mechanism than previously known.

Still another object of the present invention is to provide an inertia device of the character described which will engage the ratchet wheels with the positive action.

Still yet another object of the present invention is to provide a device which will be easy to assemble and this assembly to so place the gear with gears of different sizes so as to vary the predetermined acceleration force required to actuate the emergency mechanism.

Still yet a further object of the present invention is to provide a device of the character described which will be durable to a high degree in use.

BRIEF DESCRIPTION OF THE INVENTION

Generally, the emergency locked type belt winding devices utilize inertia for the automatic locking operations, but in the known devices the setting of the operation sensitivity was extremely difficult due to the supporting parts for the inertia members, deflection of centroid, delicate friction force and other factors. In order to overcome these problems the present invention employs a specific combination of gears, that is, utilizes the gear speed ratios in regulating the operations, so as to allow correct and easy adjustment of the setting sensitivity. The present invention also incorporates a clutch mechanism designed to effectuate perfect locking and to prevent or minimize damage to the respective mechanism to obtain enhanced safety and reliability of the device. It will be apparent that use of the present device does much for ensuring safety of the driver or passenger in a vehicle or such.

The present invention contemplates a standard safety belt winding device, a U-shaped frame carrying a spring bias ratchet wheel and a pivotal pawl normally biased away from the ratchet. Secured to one end of the reel shaft is a pivotally mounted pawl operating lever having an inverted U shaped operation carrying to rotatably mounted pinions engageable with a spur gear fixed to the reel shaft and a rotatable mounted gear abutting on a bias fly wheel. Sufficient inertia acceleration will cause a lag to be translated from the fly wheel through a rotatably mounted gear to the pinion gears causing the part operating lever to pivot. Since the lever is pivotally connected to the pawl, if the inertia force is great enough, it overcomes the pawl bias movement at engagement with the ratchet wheels.

BRIEF DESCRIPTION OF THE DRAWINGS

FIG. 2 is a front view of the device;

FIG. 3 is a side elevational view of the emergency locking mechanism in the normal state;

FIG. 4 is a view similar to FIG. 3 of the mechanism in locked condition.

DESCRIPTION OF THE PREFERRED EMBODIMENTS

Figure 1:
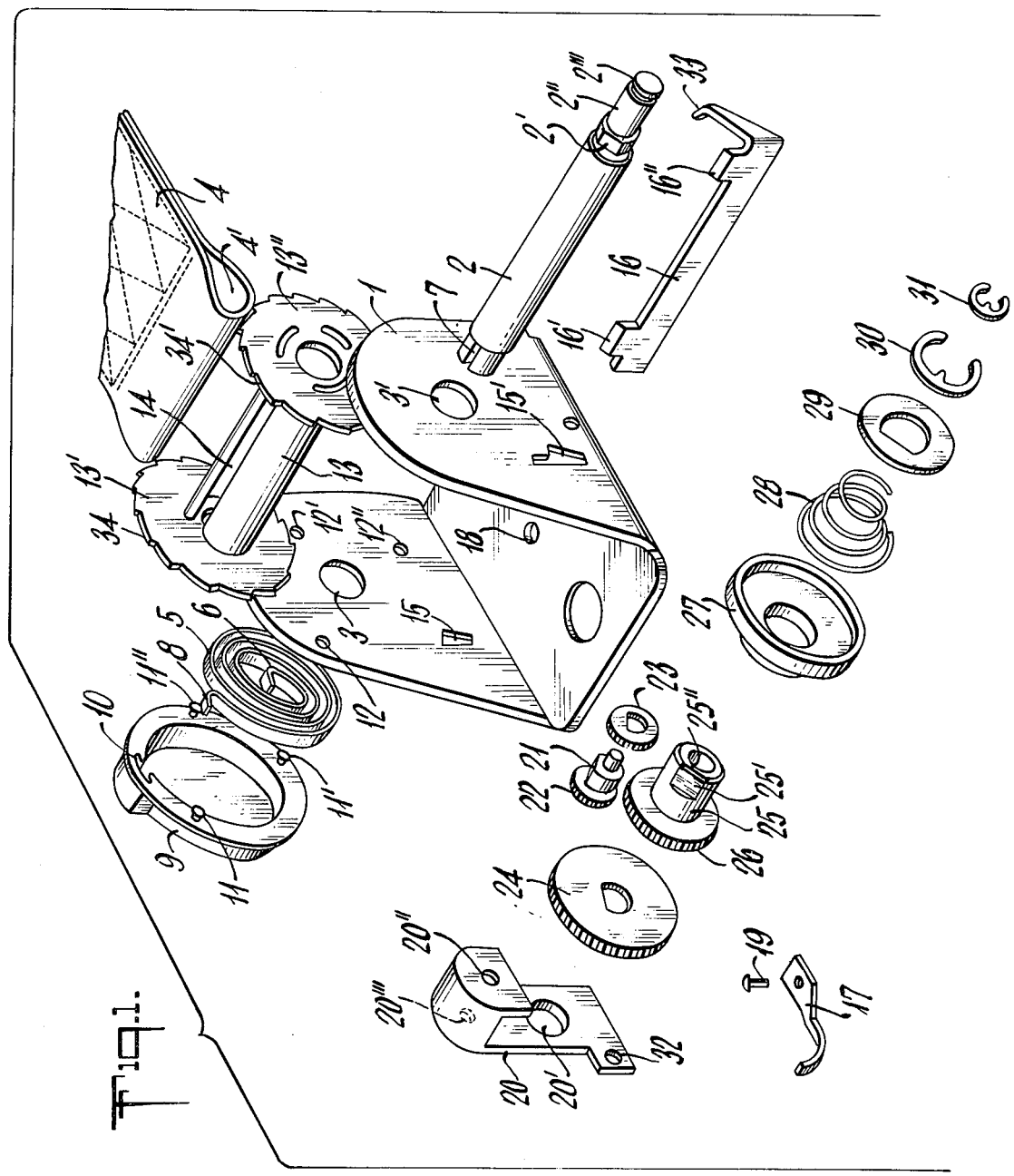
FIG. 1 is an exploded view of the component parts of the device, according to the present invention.

Turning in detail to the drawings, and more particularly to FIG. 1, the U-shaped frame 1 which constitutes the body portion of the present device is secured to the floor, a side panel, a seat or other suitable part in a vehicle or such, by bolts or other suitable means. A shaft 2 passes through the bearing holes 3, 3' in both side walls of said frame 1. At one end of said shaft extending outside of the frame 1, is mounted a coil spring 5 for biasing a safety belt 4, with the inner end 6 of said spring 5 being fixed in a slit 7 in the shaft 2 and the outer end 8 of said spring being secured in a slot 10 formed in the inner wall of a cup-shaped spring cover 9. The cover is secured to one side wall of the frame 1 with the protuberances 11, 11' and 11'' of said cover 9 being fixedly secured in the corresponding holes 12, 12' and 12'' in the side wall of the frame 1 by any known means. Mounted on said shaft 2 on the inside of the U-shaped frame 1 is a reel 13 which carries (a pair of ratchets 13' and 13''), at its both ends. Said shaft 2 also passes through a looped end 4' of the safety belt 4 which emerges through a slit 14 in the reel 13 and is wound on the reel 13 then extending outwardly of the winding device. When playing out or winding back the belt 4, said ratchets 13', 13'', reel 13 and shaft 2 all rotate together.

A pawl 16 also passes through the fan-shaped holes 15 and 15' formed in both side walls of the frame 1, so that said pawl is swingable within the defined holes 15 and 15'. As shown in FIGS. 2 and 3, said pawl is arranged such that its protuberances 16' and 16'' will be engaged with or separated from the ratchets 13' and 13'', respectively. Normally, the protuberances 16' and 16'' and the respective ratchets 13' and 13'' are kept separated from each other by a plate-shaped pawl spring 17 which is secured to the bottom of the frame 1 by a rivet 19 passed through a small hole 18 in the frame bottom.

As shown in FIGS. 1, 2 and 3, the other end of the shaft 2 extends outside of the frame 1 is passed through a hole 20' in a pawl operating lever 20 so that said lever 20 will be rotatable on said shaft 2.

Within the U-shaped portion of said pawl operating lever 20 are disposed a pinion 22 formed integrally with a pin 21, and another pinion 23 fixedly fitted on said pin 21, with the shaft thereof being rotatably passed through the holes 20'' and 20'''. At a recessed part 2' of the shaft 2 there is fixedly mounted a spur gear 24 which is meshed with the pinion 22, and at a thinned portion 2'' of said shaft 2 is rotatably mounted a gear 26 which has a boss portion 25 and which is meshed with the pinion 23.

Rotatably fitted on the boss 25 of said gear 26 are a cup-shaped clutch wheel or fly wheel 27 and a compression spring 28, while a clutch plate 29 is fixedly fitted on the recessed portion 25' of the boss 25. Also, an E-ring 30 is secured in a boss groove 25'. Further, a small-sized E-ring 31 is secured in a groove 2''' on the shaft 2 to thereby prevent removal of the parts mounted on the shaft 2. It is to be also noted that the hook-shaped portion 33 of the pawl 16 is engaged in a small hole 32 in the L-shaped portion of the pawl operating lever 20 to retain the lever 20 in the fixed position. Numerals 34 and 34' indicate the pointed ends of the teeth of said rachets 13' and 13''.

The operation of the mechanism will now be described with reference to the drawings.

FIG. 3 shows the position of the pawl operating lever 20 in normal use of the safety belt 4, and FIG. 4 shows the behavior of said lever in case of emergency. When the safety belt 4 is drawn out with normal movement of the belt wearer, the pinions 22, 23 and boss-fastened gear 26 are rotated together with the spur gear 24, keeping the pawl operating lever 20 in its stationary position shown in FIG. 3, but should an excess shock or other abnormal occurrence take place, the spur gear 24 is caused to rotate rapidly as the safety belt 4 is dragged out quickly with rush movement of the belt wearer, but the pinions 22 and 23 cannot follow such rapid rotation of the spur gear 24 as they are placed under a damping action created by pressing force of the clutch plate 29 and compression spring 28 and by the inertial action of the flywheel 27 and boss-attached gear 26, and consequently, said pinions 22 and 23 act to urge movement of the pawl operating lever 20 such that said lever will turn slightly to the position of FIG. 4, with the shaft 2 as pivot, by overcoming the opposing force of the pawl spring 17. Resultant displacement of the small hole 32 in the L-shaped portion of the lever 20 causes corresponding turn of the pawl 16 through its hook-shaped portion 33, with the result that the pawl protuberances or clicks 16' and 16'' are engaged with the respective ratchets 13' and 13'' to withhold the shaft 2 against rotation to inhibit draw-out of the safety belt 4, thereby restricting inertial movement of the belt wearer to secure his safety.

It is to be also mentioned that the cup-shaped clutch wheel 27, compression spring 28 and clutch plate 29 are arranged to perform the following action in combination. That is, should the clicks 16' and 16'' hit the pointed ends 34 and 34' of the teeth of the respective ratchets 13' and 13'' in the course of the above-said locking operation, the boss-fixed gear 26 is turned by the inertial movement of the fly wheel 27 and other said members to cause additional slight turn of the pawl operating lever 20 sufficient to let the clicks 16' and 16'' drop into the tooth roots of the ratchets 13' and 13'' to thereby secure perfect engagement while eliminating any immoderate force exerted to the respective gears 24, 22, 23 and 26.

It is claimed:

1. An inertia actuated automatic locking safety belt reel device comprising a main shaft, a belt winding reel rotatable with said main shaft in opposite belt take-up and belt withdrawal directions, spring means urging said main shaft and reel to rotate in a belt take-up direction, a ratchet wheel rotatable with said reel, a pawl movable between an advanced position engaging said ratchet wheel to lock the said reel against belt withdrawal rotation, and a retracted position disengaging said ratchet wheel, spring means biasing said pawl to its retracted position, a pawl actuating lever rockable on said main shaft between advanced and retracted positions and coupled to said pawl to respectively advance and release said pawl to its retracted position, a first gear mounted in and rotable with said main shaft, a second gear mounted in and rotatable relative to said main shaft, a gear member rotatably mounted on said actuating lever eccentric to said main shaft and engaging said first and second gears, an inertia wheel rotatably mounted on said main shaft and means including a slip coupling drive coupling said inertia wheel to said second gear.

2. The device of claim 1 comprising a hollow shaft coaxially projecting from said second gear and engaging said main shaft, said inertia wheel being rotatably mounted on said hollow shaft, an annular member mounted on and rotatable with said hollow shaft and a helical compression spring entrapped between said inertia wheel and said annular member to provide a rotatable slip coupling therebetween.

3. The device of claim 1 wherein said actuating lever radially projects from opposide sides of said main shaft and is coupled at one end to said pawl and terminates at the opposite ends in an inwardly directed yoke including radially extending side legs, said gear member being journalled between said side legs.

4. The device of claim 1 wherein said gear member comprises a third gear engaging said first gear and including an axially projecting shaft and a fourth gear mounted on and rotatable with said shaft and engaging said second gear.

5. The device of claim 1 comprising a U-shaped bracket including side plates, said main shaft extending between and projecting beyond said side plates and said reel being disposed between said side plates, a pair of said ratchet wheels being mounted on opposite ends of said reel and said pawl including a cross arm rockably supported between said side plates and having laterally spaced pawl elements movable to advanced and retracted positions relative to respective ratchet wheels with the corresponding rocking of said cross arm.

* * * * *